United States Patent
Machida et al.

(10) Patent No.: US 7,086,381 B2
(45) Date of Patent: Aug. 8, 2006

(54) APPARATUS AND METHOD FOR CONTROLLING AN INTERNAL COMBUSTION ENGINE

(75) Inventors: Kenichi Machida, Atsugi (JP); Satoru Watanabe, Atsugi (JP); Makoto Nakamura, Atsugi (JP)

(73) Assignee: Hitachi, Ltd., Tokyo-to (JP)

( * ) Notice: Subject to any disclaimer, the term of this patent is extended or adjusted under 35 U.S.C. 154(b) by 200 days.

(21) Appl. No.: 10/201,199

(22) Filed: Jul. 24, 2002

(65) Prior Publication Data

US 2003/0019475 A1 Jan. 30, 2003

(30) Foreign Application Priority Data

Jul. 26, 2001 (JP) ............................. 2001-226722

(51) Int. Cl.
*F02D 13/00* (2006.01)

(52) U.S. Cl. .................... 123/405; 123/478; 123/90.16

(58) Field of Classification Search ............ 123/90.15, 123/90.16, 90.17, 406, 404, 405, 347, 348
See application file for complete search history.

(56) References Cited

U.S. PATENT DOCUMENTS

| | | | | |
|---|---|---|---|---|
| 4,995,364 A | * | 2/1991 | Kamei et al. | 123/442 |
| 5,343,840 A | * | 9/1994 | Wataya et al. | 123/399 |
| 6,073,610 A | * | 6/2000 | Matsumoto et al. | 123/396 |
| 6,079,381 A | | 6/2000 | Morikawa | |
| 6,123,053 A | | 9/2000 | Hara et al. | |
| 6,135,085 A | * | 10/2000 | Toyohara et al. | 123/306 |
| 6,457,353 B1 | * | 10/2002 | Kanke et al. | 73/117.3 |
| 6,491,022 B1 | * | 12/2002 | Okamoto | 123/90.15 |
| 6,622,678 B1 | * | 9/2003 | Shimizu et al. | 123/90.16 |
| 6,687,601 B1 | * | 2/2004 | Bale et al. | 701/108 |
| 6,732,707 B1 | * | 5/2004 | Kidokoro et al. | 123/396 |
| 2002/0023604 A1 | * | 2/2002 | Nohara et al. | 123/90.15 |

FOREIGN PATENT DOCUMENTS

| | | |
|---|---|---|
| EP | 0 831 218 A2 | 3/1998 |
| JP | 04-330331 A | 11/1992 |
| JP | 11-148381 A | 6/1999 |
| JP | 2001-12262 | 1/2001 |

* cited by examiner

*Primary Examiner*—Stephen K. Cronin
*Assistant Examiner*—Arnold Castro
(74) *Attorney, Agent, or Firm*—Foley & Lardner LLP

(57) ABSTRACT

A plurality of intake air amount control systems are provided for diagnosing a failure of each intake air amount control system. At the failure of any of them, a fail-safe control is performed using a normal intake air amount control system.

22 Claims, 10 Drawing Sheets

APPARATUS AND METHOD FOR CONTROLLING AN INTERNAL COMBUSTION ENGINE

FIELD OF THE INVENTION

The present invention relates to a failure diagnosis and a fail-safe control of an intake air amount control system in an internal combustion engine.

RELATED ART OF THE INVENTION

Heretofore, there has been known a variable valve mechanism which successively varies a valve lift amount and a valve operating angle of an intake valve and an exhaust valve (disclosed in Japanese Unexamined Patent Publication No. 2001-012262).

The above mentioned variable valve mechanism is provided with a control shaft disposed substantially in parallel with a camshaft, a control cam eccentrically fixed to a periphery of the control shaft, a rocker arm axially supported by the control cam so as to be enable to swing, a link arm and an eccentric cam that drive to swing one end of the rocker arm in response to rotation of the camshaft, a swing cam which is connected to the other end of the rocker arm and swings to open an intake valve and an exhaust valve, and a DC servo motor which drives and rotates the control shaft.

The DC servo motor is feedback controlled so as to coincide an actual operating angle of the control shaft detected by an operating angle sensor with a target operating angle corresponding to a required valve opening characteristic.

This variable valve mechanism can control an intake air amount independently of a throttle valve by making a valve lift amount and a valve operating angle variable. In case where an intake negative pressure as a negative pressure source of a brake or an intake negative pressure for sucking a purge gas and a blow-by gas into an intake system is required, the throttle valve is provided for generating the intake negative pressure under a predetermined condition.

When the intake air amount is controlled using the above variable valve mechanism, it is required to perform surely the control of the intake air amount even if the variable valve mechanism is failed.

SUMMARY OF THE INVENTION

The present invention has been achieved for solving the foregoing problem, and has an object to perform an appropriate intake air amount control even if an intake air amount control system is failed.

In order to achieve the above object, according to the present invention, a plurality of intake air amount control systems are provided, to diagnose a failure for each intake air amount control system, to thereby enable to perform a fail-safe control using a normal intake air control system.

Other objects and features of this invention will be understood from the following description with reference to the accompanying drawings.

DETAILED DESCRIPTION OF THE PREFERRED EMBODIMENT

An embodiment according to the invention will be described with reference to the drawings.

Figure 1:
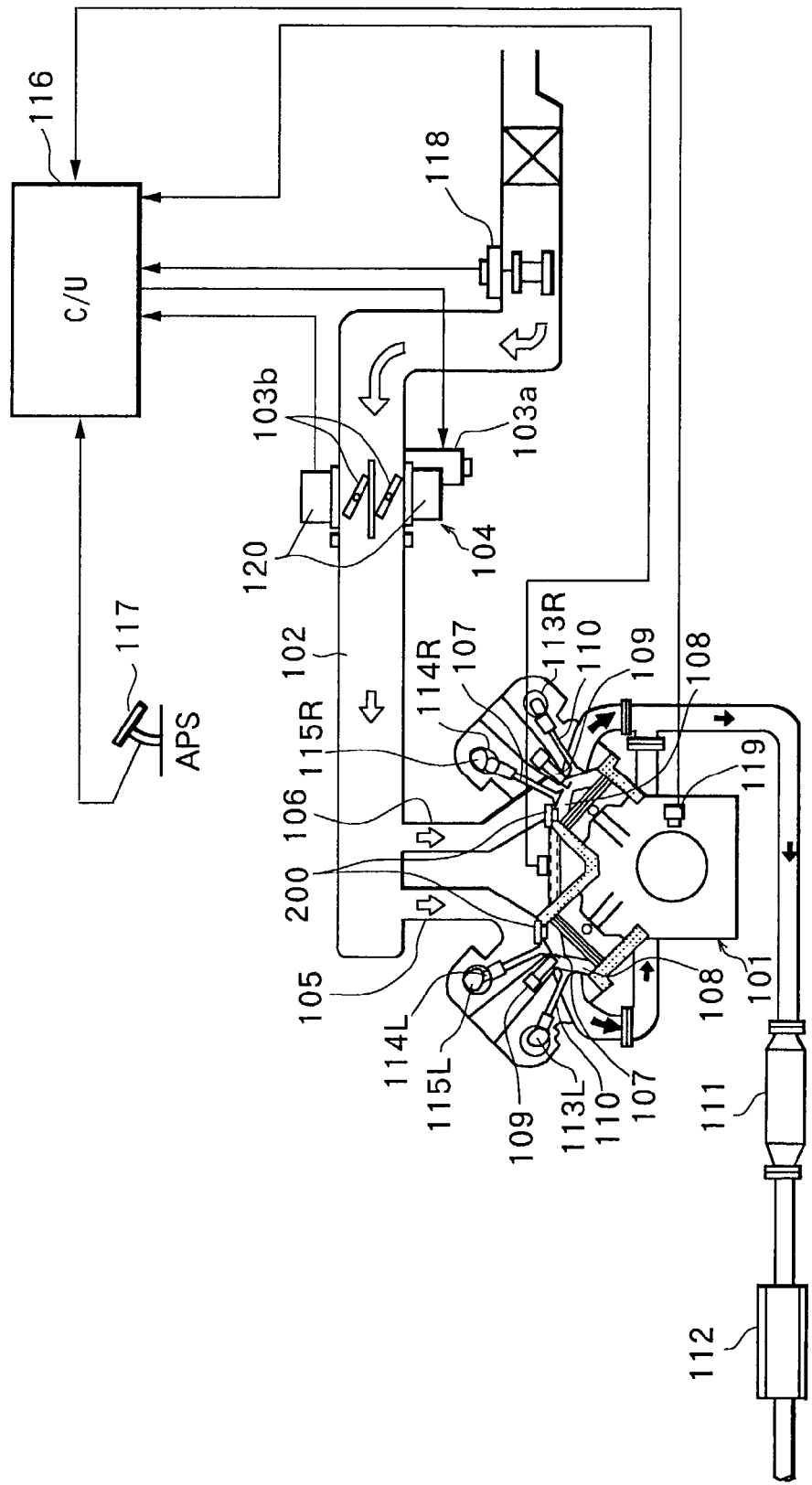
FIG. 1 is a structure view of an engine according to an embodiment of the present invention.

FIG. 1 is a structure view of an internal combustion engine for a vehicle in an embodiment. In an intake passage 102 upstream of a V-type internal combustion engine 101 is disposed an electronically controlled throttle ETC 104 that drives to open and close a throttle valve 103b by a throttle motor 103a. The intake passage 102 is branched into intake manifolds 105 and 106 connected with a left bank and a right bank, respectively. Air is sucked into a combustion chamber 108 of each bank through an intake valve 107 of each cylinder via intake manifolds 105 and 106 from electronically controlled throttle ETC 104. An ignition plug 109 is disposed in each combustion chamber 108. A fuel injection valve 200 is provided for each cylinder.

A combustion exhaust gas is discharged from combustion chamber 108 via each exhaust valve 110 and is purified by a catalyst 111 to be released into the atmosphere.

Each exhaust valve 110 is driven to open and close with a constant valve lift amount and a constant valve operating angle maintained, by cams 113L and 113R each axially supported by an exhaust valve side camshaft of each bank. On the other hand, for each intake valve 107, a valve lift amount and a valve operating angle thereof are successively varied by each of variable valve mechanisms VEL 114L and 114R, so that an intake air amount can be variably controlled.

Each of variable valve mechanisms VEL 114L and 114R successively varies the valve lift amount and the valve operating angle of intake valve 107 by varying an operating angle of a control shaft by a motor (not shown in the figure), as will be later described. This operating angle is detected by each of potentiometer type operating angle sensors 115L and 115R.

A control unit 116 controls electronically controlled throttle ETC 104, and variable valve mechanisms VEL 114L and 114R corresponding to an accelerator opening degree detected by an accelerator opening degree sensor APS 117 so that the intake air amount corresponding to the accelerator opening angle can be obtained based on an opening degree of throttle valve 103b and an opening characteristic of intake valve 107. However, in a basic engine operating condition other than an engine operating condition where the intake negative pressure is required, throttle valve 103b is kept fully open and the intake air amount is controlled only by the variable valve mechanisms VEL 114L and 114R. Thus, this embodiment is provided with intake air control systems comprising two variable valve mechanisms VEL 114L and 114R for respective cylinder groups on the left and right banks.

Control unit 116 receives detection signals from acceleration opening degree sensor APS 117, an air flow meter 118 which detects the intake air amount (mass flow amount), a crank angle sensor 119 which takes out a rotation signal from a crankshaft, a throttle sensor 120 which detects an opening degree of throttle valve 103b and the like.

Figure 2:
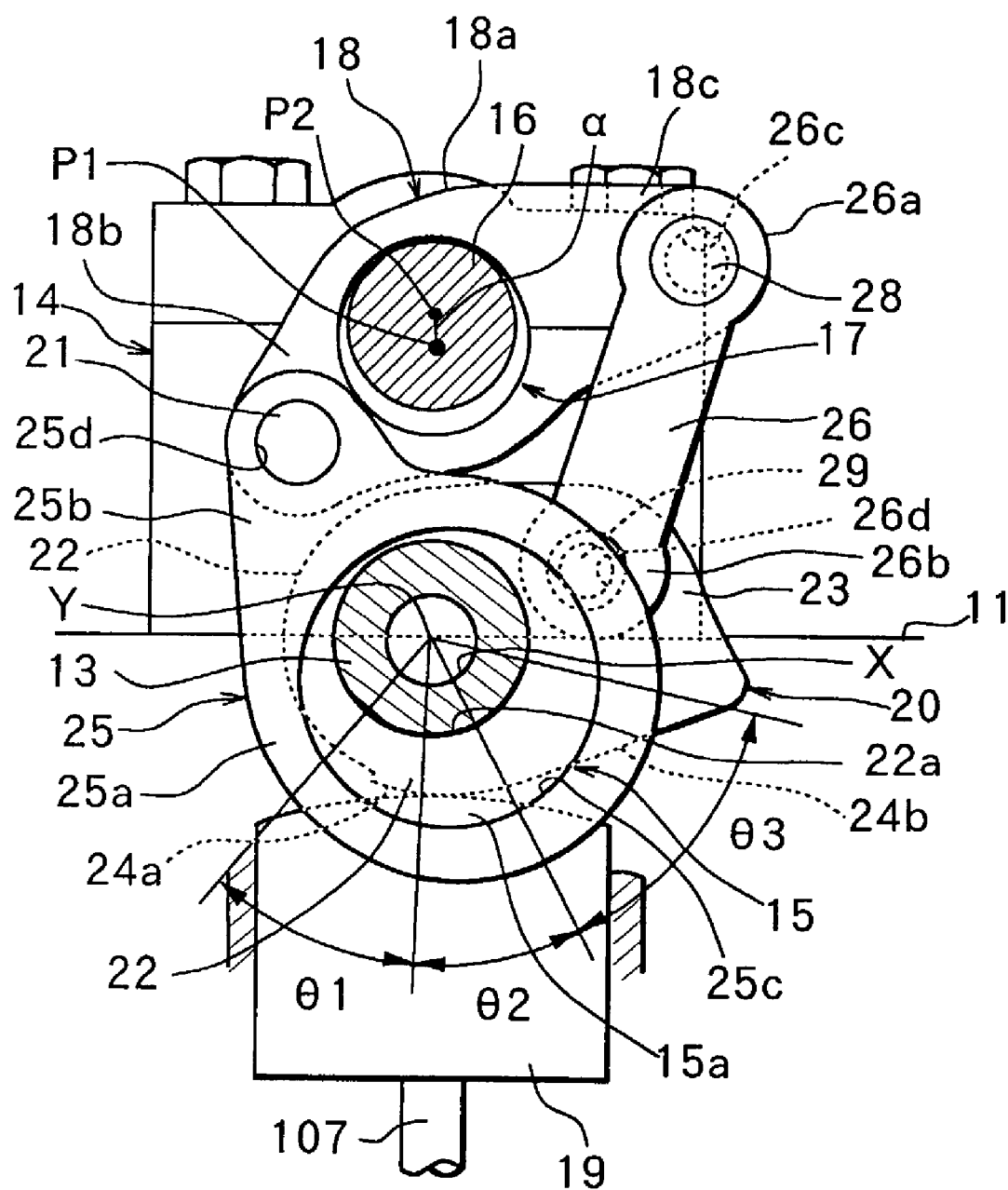
FIG. 2 is a cross section view showing a variable valve mechanism in the embodiment of the invention (A—A cross section view of FIG. 3).
Figure 3:
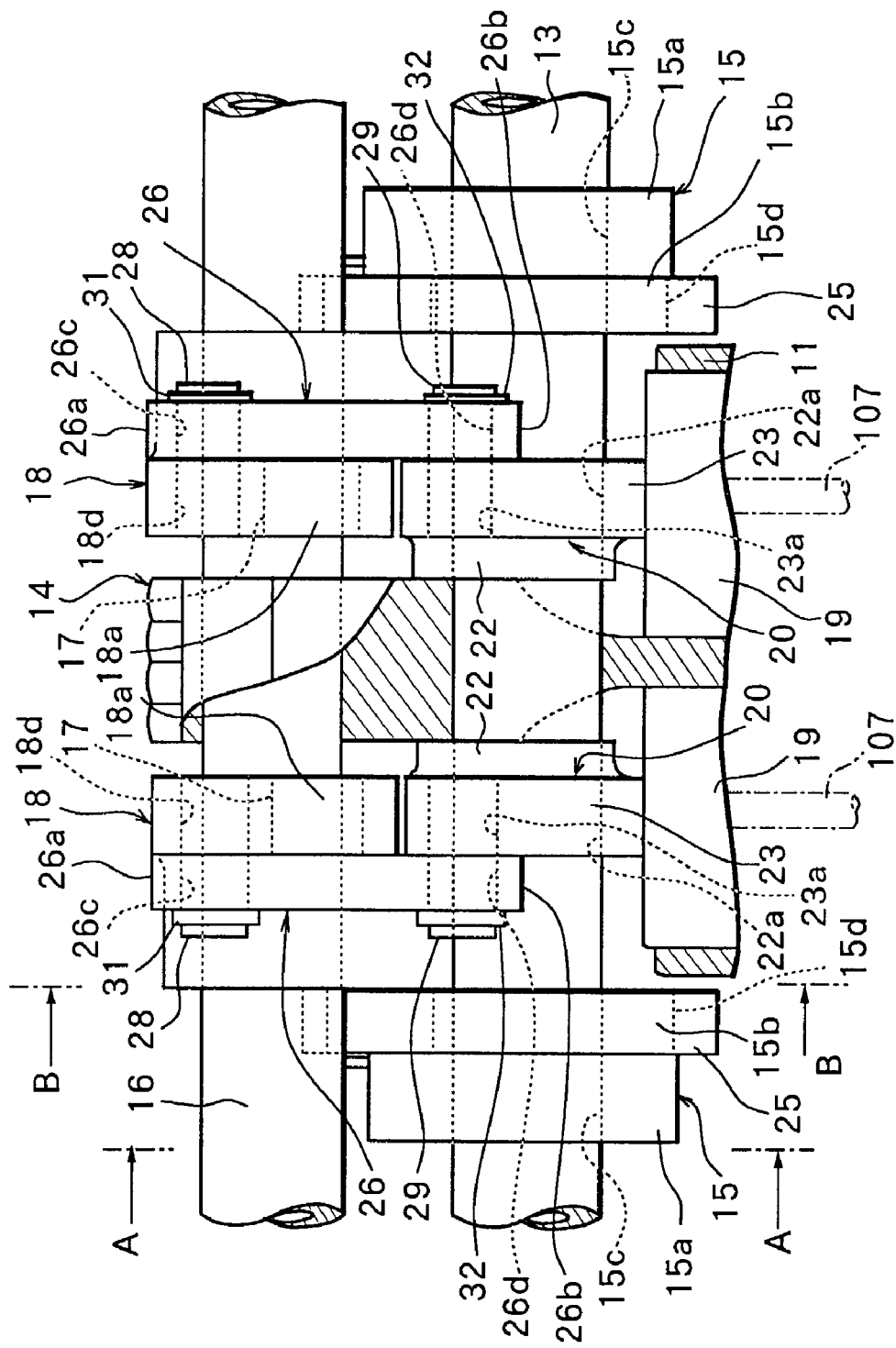
FIG. 3 is a side elevation view of the variable valve mechanism.
Figure 4:
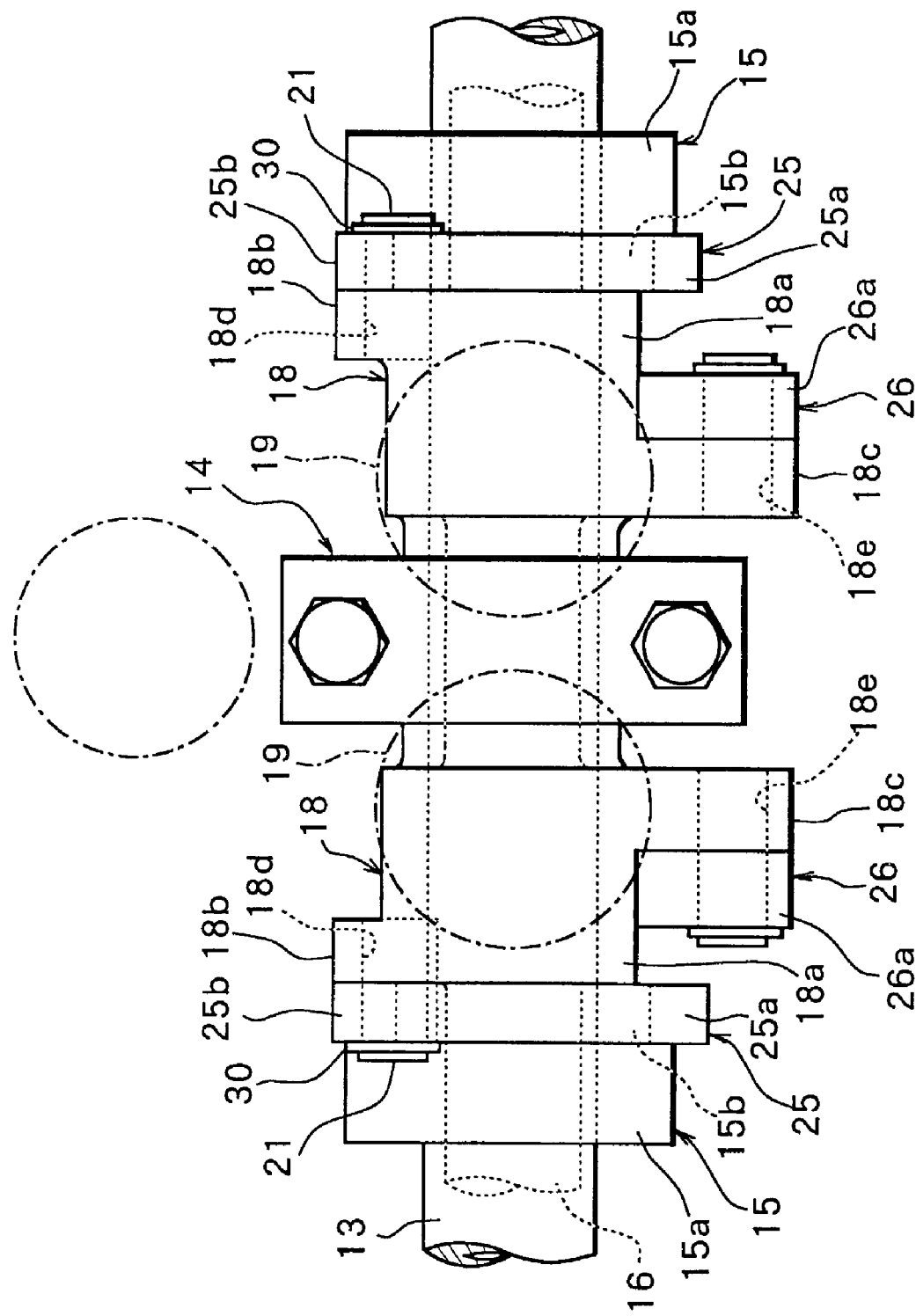
FIG. 4 is a top plan view of the variable valve mechanism.

FIG. 2 to FIG. 4 show a detailed structure of variable valve mechanism VEL 114.

The variable valve mechanism VEL shown in FIG. 2 to FIG. 4 includes a pair of intake valves 107, 107, a hollow camshaft 13 rotatably supported by a cam bearing 14 of a cylinder head 11, two eccentric cams 15, 15 as rotation cams axially supported by camshaft 13, a control shaft 16 rotatably supported by the same cam bearing 14 at an upper position of camshaft 13, a pair of rocker arms 18, 18 swingingly supported by control shaft 16 through a control cam 17, and a pair of independent swing cams 20, 20 disposed to upper portions of intake valves 107, 107 through valve lifters 19, 19, respectively.

Eccentric cams 15, 15 are connected with rocker arms 18, 18 by link arms 25, 25, respectively. Rocker arms 18,18 are connected with swing cams 20, 20 by link members 26, 26.

Figure 5:
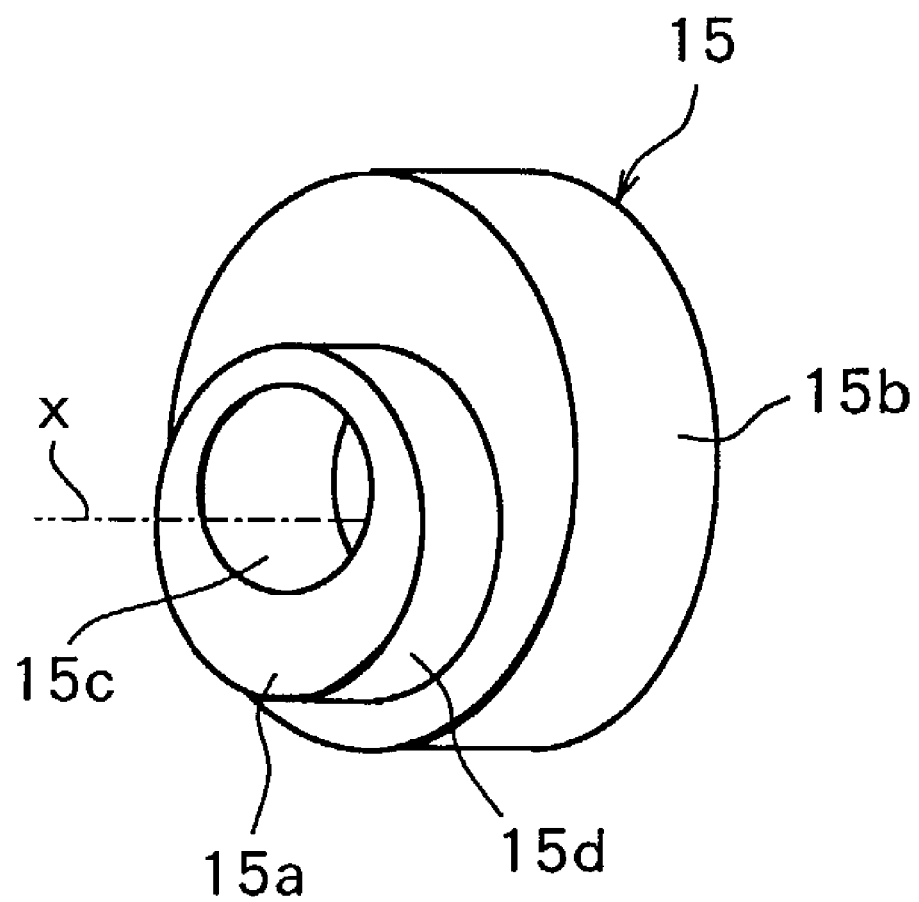
FIG. 5 is a perspective view showing an eccentric cam for use in the variable valve mechanism.

Each eccentric cam 15, as shown in FIG. 5, is formed in a substantially ring shape and includes a cam body 15a of small diameter, a flange portion 15b integrally formed on an outer surface of cam body 15a. A camshaft insertion hole 15c is formed through the interior of eccentric cam in an axial direction, and also a axis center X of cam body 15a is biased from a axis center Y of camshaft 13 by a predetermined amount.

The pair of eccentric cams 15, 15 are pressed and fixed to camshaft 13 via camshaft insertion holes 15c at positions of both outer sides of valve lifters 19, 19 for not interfering with valve lifters 19, 19.

Each rocker arm 18, as shown in FIG. 4, is bent and formed in a substantially crank shape, and a central base portion 18a thereof is rotatably supported by control cam 17.

A pin hole 18d is formed through one end portion 18b which is formed to protrude from an outer end portion of base portion 18a. A pin 21 to be connected with a tip portion of link arm 25 is pressed into pin hole 18d. A pin hole 18e is formed through the other end portion 18c which is formed to protrude from an inner end portion of base portion 18a. A pin 28 to be connected with one end portion 26a (to be described later) of each link member 26 is pressed into pin hole 18e.

Control cam 17 is formed in a cylindrical shape and fixed to a periphery of control shaft 16. As shown in FIG. 2, a axis center P1 position of control cam 17 is biased from a axis center P2 position of control shaft 16 by α.

Figure 6:
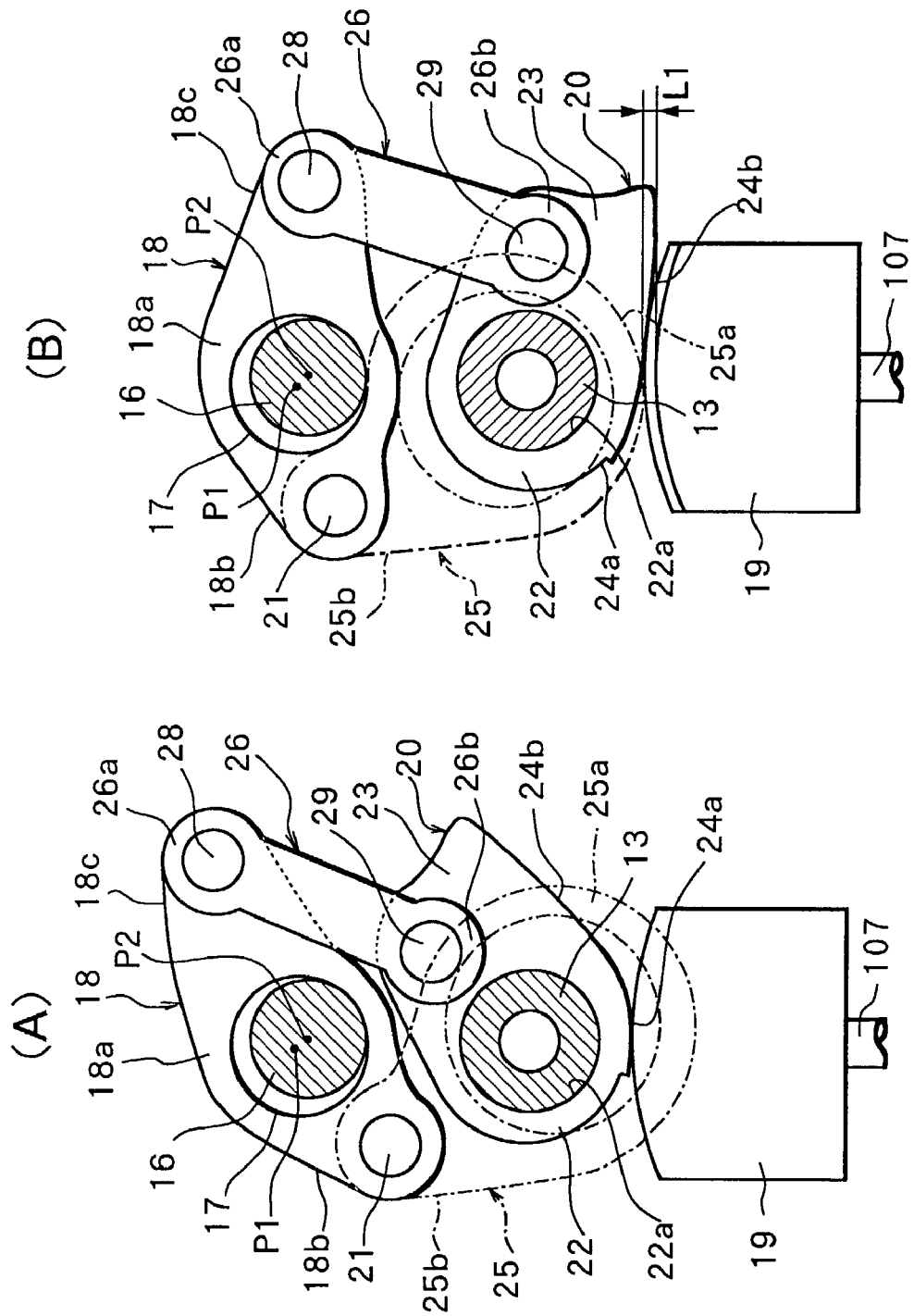
FIG. 6A and FIG. 6B are cross section views showing an operation of the variable valve mechanism at a low lift condition (B—B cross section view of FIG. 3).
Figure 7:
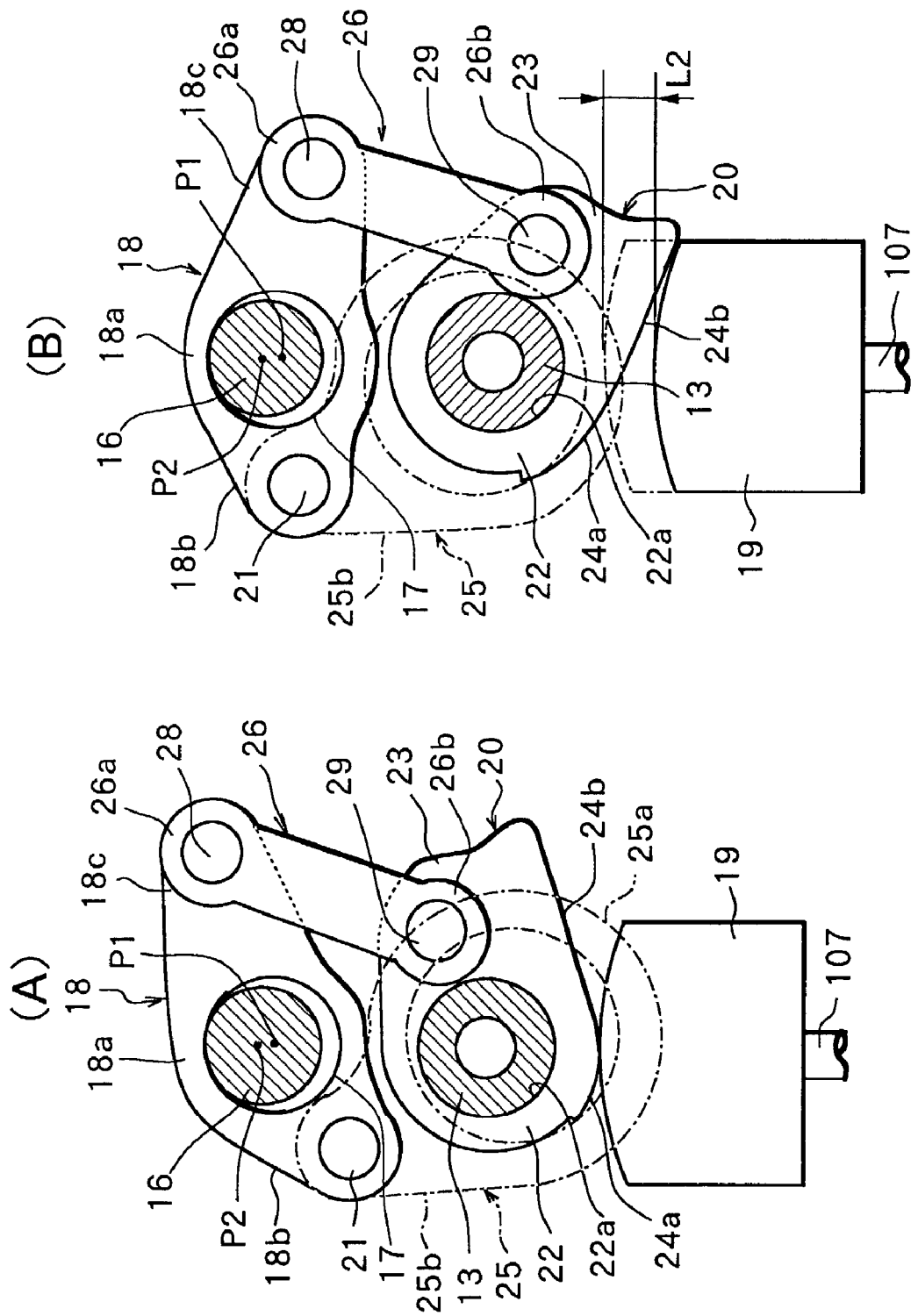
FIG. 7A and FIG. 7B are cross section views showing an operation of the variable valve mechanism at a high lift condition (B—B cross section view of FIG. 3).

Swing cam 20 is formed in a substantially lateral U-shape as shown in FIG. 2, FIG. 6 and FIG. 7, and a supporting hole 22a is formed through a substantially ring-shaped base end portion 22. Camshaft 13 is inserted into base end portion 22 to be rotatably supported. Also, a pin hole 23a is formed through an end portion 23 positioned at the other end portion 18c of rocker arm 18.

A base circular surface 24a of base end portion 22 side and a cam surface 24b extending in an arc shape from base circular surface 24a to an edge of end portion 23, are formed on a bottom surface of swing cam 20. Base circular surface 24a and cam surface 24b are in contact with a predetermined position of an upper surface of each valve lifter 19 corresponding to a swing position of swing cam 20.

Figure 8:
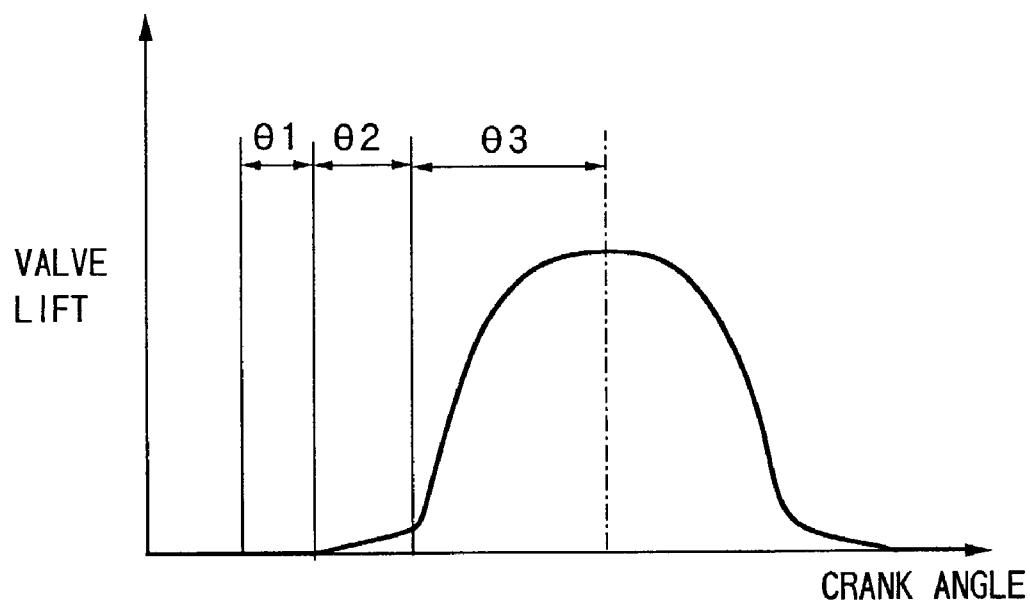
FIG. 8 is a valve lift characteristic diagram corresponding to a base surface and a cam surface of a swing cam in the variable valve mechanism.

Namely, according to a valve lift characteristic shown in FIG. 8, as shown in FIG. 2, a predetermined angle range $\theta 1$ of base circular surface 24a is a base circle interval and a range of from base circle interval $\theta 1$ of cam surface 24b to a predetermined angle range $\theta 2$ is a so-called ramp interval, and a range of from ramp interval $\theta 2$ of cam surface 24b to a predetermined angle range $\theta 3$ is a lift interval.

Link arm 25 includes a ring-shaped base portion 25a and a protrusion end 25b protrudingly formed on a predetermined position of an outer surface of base portion 25a. A fitting hole 25c rotatably to be fitted with an outer surface of cam body 15a of eccentric cam 15 is formed on a central position of base portion 25a. Also, a pin hole 25b into which pin 21 is inserted is formed through protrusion end 25b.

A swinging-driving member is composed of link arm 25 and eccentric cam 15.

Link member 26 is formed in a linear shape of predetermined length and pin insertion holes 26c, 26d are formed through both circular end portions 26a, 26b. End portions of pins 28, 29 pressed into pin hole 18d of the other end portion 18c of rocker arm 18 and pin hole 23a of end portion 23 of swing cam 20, respectively, are rotatably inserted into pin insertion holes 26c, 26d.

Snap rings 30, 31, 32 restricting axial transfer of link arm 25 and link member 26 are disposed on respective end portions of pins 21, 28, 29.

Figure 9:
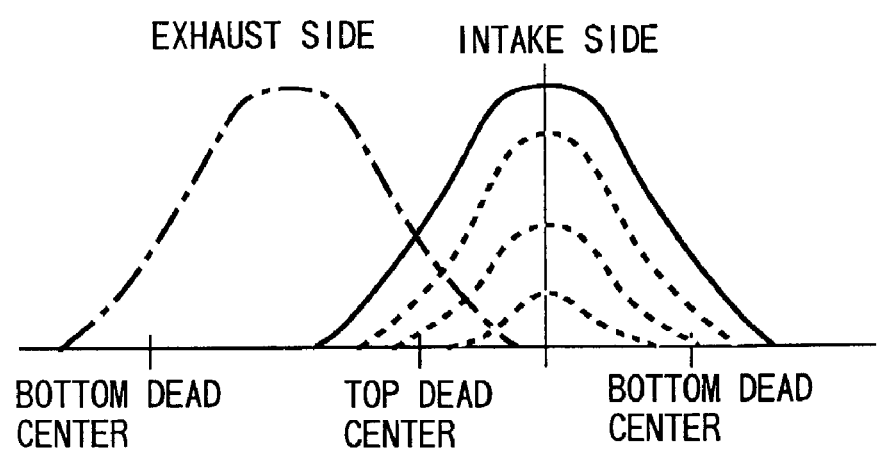
FIG. 9 is a characteristic diagram showing valve timing and valve lift of the variable valve mechanism.

Control shaft 16 is driven to rotate within a predetermined angle range by an actuator such as a DC servo motor disposed at one end portion thereof. By varying the operating angle of control shaft 16 by the actuator, the valve lift amount and the valve operating angle of intake valve 107 are successively varied so that the valve operating angle is decreasingly varied corresponding to a decrease of the valve lift amount (see FIG. 9).

In order to vary the valve lift amount and the valve operating angle to be small, as shown in FIG. 6A and FIG. 6B, control shaft 16 is rotated so that the axis center P2 of control shaft 16 is positioned downward of the axis center P1 of control cam 17. On the other hand, in order to vary the valve lift amount and the valve operating angle to be large, as shown in FIG. 7A and FIG. 7B, control shaft 16 is rotated so that the axis center P2 of control shaft 16 is positioned upward of the axis center P1 of control cam 17.

Control unit 116 converts an output of operating angle sensor 113 into the operating angle of control shaft 16 according to a previously set conversion characteristic and feedback controls the actuator so as to coincide the detection result of the operating angle with a target value.

Next, a fail-safe control at the failure time of the intake air amount control system according to the invention will be described in V-type internal combustion engine 101 provided with two variable valve mechanisms VEL 114L and 114R for each bank (cylinder group) as the above intake air amount control system.

Specifically, a failure diagnosis is performed for each of variable valve mechanisms VEL 114L and 114R. When one variable valve mechanism VEL is failed, the other variable valve mechanism VEL is used for the fail-safe control for compensating for the intake air amount control.

The fail-safe control will be described according to a flowchart in FIG. 10 with reference to a block diagram in FIG. 11.

At Step 1, it is diagnosed whether or not variable valve mechanism VEL 114L on the left bank is failed and at Step 2, it is diagnosed whether or not variable valve mechanism VEL 114R on the right bank is failed.

Figure 11:
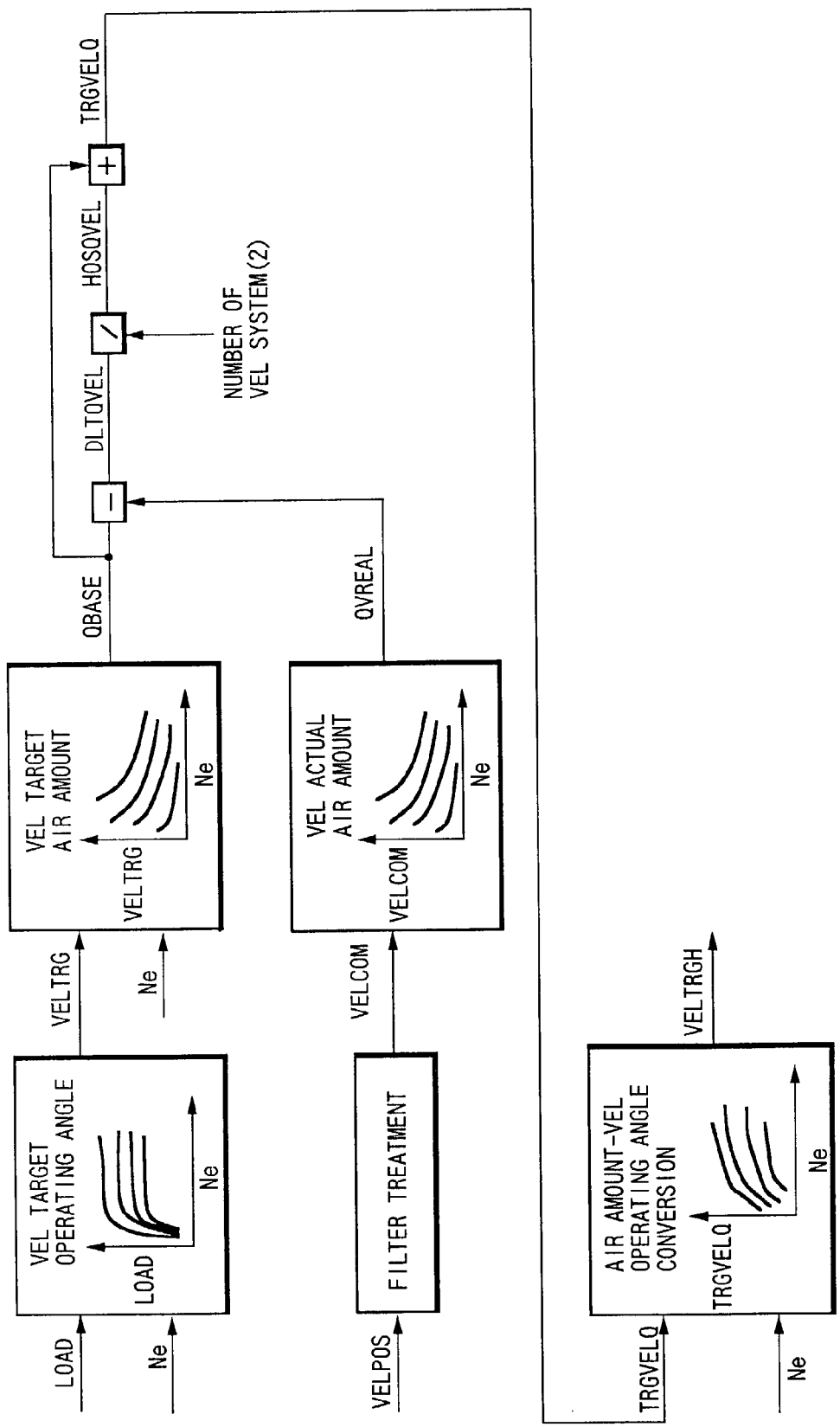
FIG. 11 is a control block diagram showing the fail-safe control in the embodiment.

Specifically, this failure diagnosis is performed for each variable valve mechanism VEL as shown in FIG. 11.

Firstly, a target operating angle VELTRG of the variable valve mechanism VEL is obtained by referring to a map, based on an engine load LOAD detected by acceleration opening degree sensor APS 117 and an engine rotation speed Ne.

Then, a target air amount (base air amount) QBASE corresponding to a normal condition is obtained by referring to the map based on the target operating angle VELTRG and the engine rotation speed Ne.

At the same time, an actual operating angle VELPOS of the variable valve mechanism VEL is detected by operating angle sensor 115, to calculate a smoothing operating angle VELCOM by filter treatment.

An actual air amount QVREAL corresponding to an actual state of the variable valve mechanism VEL is obtained by referring to the map based on the actual operating angle VELCOM and the engine rotation speed Ne.

A deviation DLTQVEL between the target air amount QBASE and the actual air amount QVREAL is calculated.

This deviation DLTQVEL has a predetermined value at a failure of the variable valve mechanism VEL. For example, when one of the variable valve mechanisms VEL failed such that the air amount is reduced, since the actual air amount QVREAL becomes less than the target air amount QBASE, the deviation DLTVEL has a positive value. On the other hand, one of the variable valve mechanisms VEL failed such that the air amount is increased, since the actual air amount QVREAL becomes more than the target air amount QBASE, the deviation DLTQVEL has a negative value.

Figure 10:
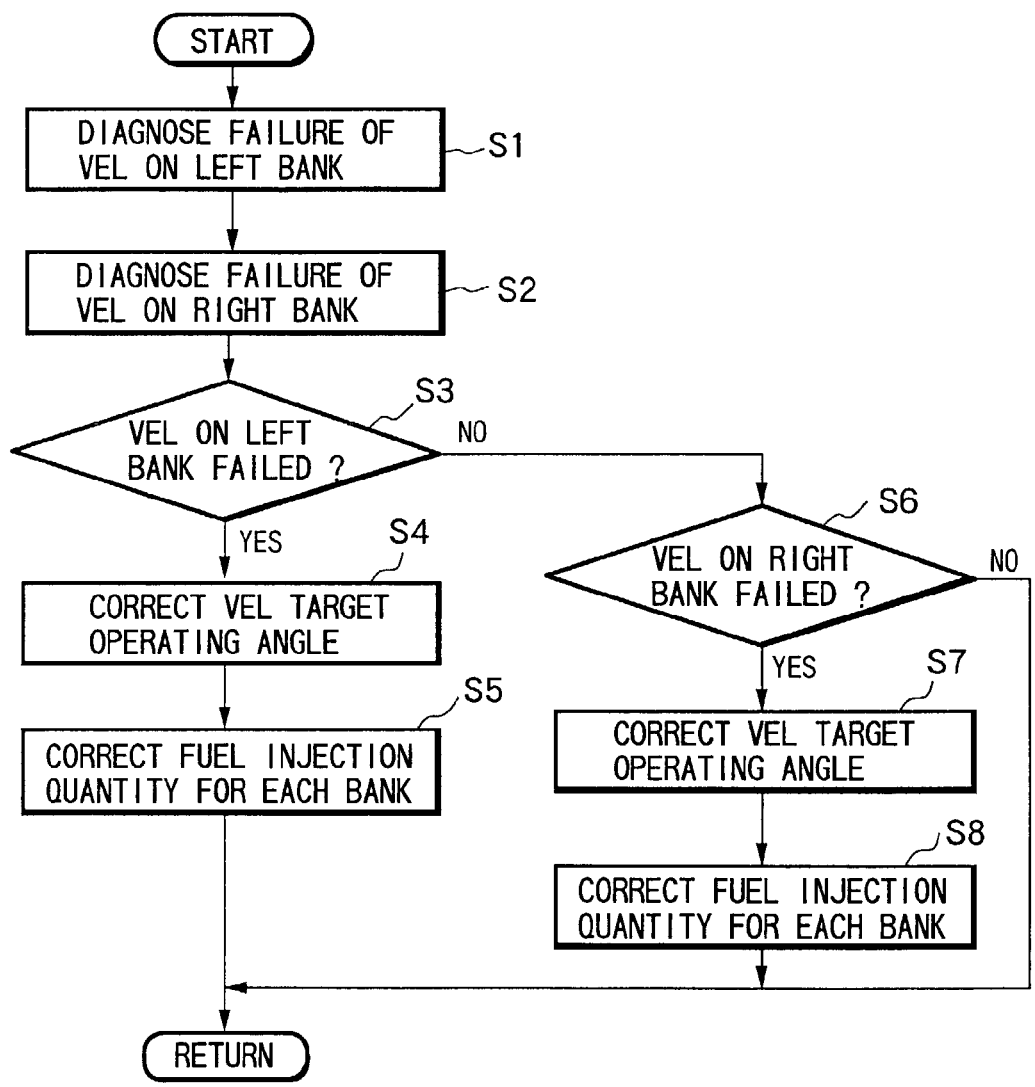
FIG. 10 is a flowchart showing a fail-safe control in the embodiment

At Step 3 in FIG. 10, it is determined whether or not variable valve mechanism VEL 114L on the left bank failed. When a failure of variable valve mechanism VEL 114L is determined, control proceeds to Step 4 where the target operating angle of variable valve mechanism VEL 114R is corrected based on the operating angle of variable valve mechanism VEL 114L on the left bank fixed due to the failure thereof.

When no failure of variable valve mechanism VEL 114L on the left bank is determined at Step 3 in FIG. 10, control proceeds to Step 6 where it is determined whether or not variable valve mechanism VEL 114R on the right bank failed. When a failure of variable valve mechanism VEL 114R is determined, control proceeds to Step 7 where the target operating angle of variable valve mechanism VEL 114L is corrected based on the operating angle of variable valve mechanism VEL 114R on the right bank fixed due to the failure thereof.

Specifically, the correction of the target operating angle, as shown in FIG. 11, the deviation DLTQVEL between the described target air amount QBASE and the actual air amount QREAL is divided by the number of variable valve mechanism VEL systems (2 in this embodiment), and the resultant value is made a correction amount HOSQVEL of the target air amount relative to the variable valve mechanism at a normal side. Here, the reason why the deviation DLTQVEL is divided by the number of variable valve mechanism VEL systems is that, although the actual air amount QVREAL at the failure is calculated as a total intake air amount in a state of the failure of the entire systems, an actual deviation amount of the intake air amount due to the failure is a deviation amount due to the failed variable valve mechanism VEL only, and this deviation amount is to be adjusted by variable valve mechanism VEL at the normal side.

This correction amount HOSQVEL of the target air amount is added to the target air amount QBASE, to correct a target intake air amount TRGVELQ, and then a target operating angle VELTRGH after corrected is calculated based on the corrected target intake air amount TRGVELQ and the engine rotation speed Ne.

Thus, the normal side variable valve mechanism VEL is controlled so as to obtain the corrected target operating angle VELTRGH, so that the total intake air amount is adjusted to be equal to the value at the normal time.

By accurately controlling the total intake air amount, a total fuel injection quantity for all cylinders calculated based on the intake air amount detected by the air flow meter is ensured to be equal to the same value at the normal time. Therefore, a primary fail-safe function can be achieved only even with this control. However, if the same fuel injection quantity is supplied to the failed cylinder group and the normal cylinder group, one of the groups is deviated to a richer side and the other of the groups is deviated to a leaner side relative to a target air-fuel ratio. As a result, the exhaust gas purification performance is deteriorated and a total output torque is deviated from a target value due to variations in the combustion efficiency.

Therefore, in order to ensure more accurate fail-safe performance, the fuel injection quantity is corrected corresponding to each of the intake air amount of the failed variable valve mechanism VEL and the intake air amount of the normal variable valve mechanism VEL.

That is, at the failure of the variable valve mechanism VEL 114L on the left bank, at Step 5, a fuel injection quantity Ti is corrected for each of the normal cylinder group on the right bank and the failed cylinder group on the left bank as the following equations.

Basic fuel injection quantity Tp=Kconst #×Q/Ne (Kconst #:constant)

Fuel injection quantity TiR on the right bank=(Tp+VEL-HOS)×COEF+Ts

Fuel injection quantity TiL on the left bank=(Tp−VEL-HOS)×COEF+Ts (COEF:correction coefficient based on a water temperature, and Ts: battery voltage correction component)

VELHOS is calculated using the correction amount HOSQVEL of the target air amount as follows.

VELHOS=Kconst #×HOSQVEL/Ne

In the same way as the above, at the failure of the variable valve mechanism VEL 114R on the right bank, at Step 8, the fuel injection quantity Ti is corrected for each of the normal cylinder group on the left bank and the failed cylinder group on the right bank as the following equations.

Fuel injection quantity TiL on the left bank=(Tp+VEL-HOS)×COEF+Ts

Fuel injection quantity TiR on the right bank=(Tp−VEL-HOS)×COEF+Ts

Thus, since the fuel injection quantity is set corresponding to each of the intake air amount of the failed variable valve mechanism VEL and the intake air amount of the normal variable valve mechanism VEL, the target air-fuel ratio is achieved in each of the failed cylinder group and the normal cylinder group. Therefore, the exhaust gas purification performance and the power performance can be maintained satisfactorily.

Since the present invention is applied to the V-type internal combustion engine in the above embodiment, the variable valve mechanism is provided on each of banks.

Accordingly, a further variable valve mechanism is not necessary for the fail-safe control. However, the present invention can be also applied to an in-line type internal combustion engine. In such a case, for example, in a 6 cylinder in-line engine, one variable valve mechanism may be disposed to a cylinder group of #1–#3 cylinders and the other variable valve mechanism to a cylinder group of #4–#6 cylinders.

As another embodiment, when any of variable valve mechanisms VEL failed such that the air amount is increased excessively, the opening degree of throttle valve as another intake air amount control system can be controlled narrower, to thereby adjust the total intake air amount to be equal to that at the normal time.

The entire contents of Japanese Patent Application No. 2001-226722, filed Jul. 26, 2001, a priority of which is claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed:

1. A control apparatus of an internal combustion engine, comprising:
   a plurality of intake air amount control systems including at least one intake air amount control system using a variable valve mechanism which controls an intake air amount by variably controlling opening and closing characteristic of an engine valve;
   a diagnosis mechanism which diagnoses a failure for each of said plurality of the intake air amount control systems; and
   at least one of:
      a first intake air amount adjustment mechanism which adjusts, when said diagnosis mechanism detects that at least one intake air amount control system using the variable valve mechanism has failed, the intake air amount by another intake air amount control system using the variable valve mechanism which is diagnosed to be normal by said diagnosis mechanism or by the intake air amount control system which does not use the variable valve mechanism, and
      a second intake air amount adjustment mechanism which adjusts, when said diagnosis mechanism detects that said intake air amount control system which does not use the variable valve mechanisms has failed, the intake air amount by at least one intake air amount control system using the variable valve mechanism which is diagnosed to be normal by said diagnosis mechanism.

2. A control apparatus of an internal combustion engine according to claim 1,
   wherein, when said intake air amount control system which is diagnosed to be abnormal by said diagnosis mechanism has failed such that the intake air amount is reduced, said first intake air amount adjustment mechanism or said second intake air amount adjustment mechanism increasingly adjusts the intake air amount by at least one of said intake air amount control systems which are diagnosed to be normal by said diagnosis mechanism.

3. A control apparatus of an internal combustion engine according to claim 1,
   wherein, when said intake air amount control systems which is diagnosed to be abnormal by said diagnosis mechanism has failed such that the intake air amount is increased excessively, said first intake air amount adjustment mechanism or said second intake air amount adjustment mechanism decreasingly adjusts the intake air amount by at least one of said intake air amount control systems which are diagnosed to be normal by said diagnosis mechanism.

4. A control apparatus of an internal combustion engine according to claim 1,
   wherein said intake air amount control systems using the variable valve mechanisms are provided for each of a plurality of cylinder groups and control the intake air amount independently.

5. A control apparatus of an internal combustion engine according to claim 4,
   wherein said plurality of intake air amount control systems includes a plurality of intake air amount control systems using the variable valve mechanisms.

6. A control apparatus of an internal combustion engine according to claim 1,
   wherein said variable valve mechanism comprises:
      a driving shaft which rotates in synchronization with a crankshaft;
      a driving cam fixed to said driving shaft;
      a swing cam which swings to operate the engine valve to open and close;
      a transmission mechanism one end of which is connected with said driving cam side and the other end of which is connected with said swing cam side;
      a control shaft including a control cam to vary a position of said transmission mechanism; and
      an actuator which rotates said control shaft, and
      wherein a lift characteristic of the engine valve is made variable by controlling the rotation of said control shaft by said actuator.

7. A control apparatus of an internal combustion engine according to claim 1, further comprising:
   an intake air amount adjustment mechanism which detects the valve opening and closing characteristic of the engine valve controlled by the variable valve mechanism diagnosed as the failure, and determines a correction amount of the valve opening and closing characteristic of the engine valve controlled by the normal variable valve mechanism other than the failed variable valve mechanism based on the detection value.

8. A control apparatus of an internal combustion engine according to claim 1, further comprising:
   a fuel injection quantity adjustment mechanism which corrects a fuel injection quantity of a corresponding cylinder group according to the valve opening and closing characteristic of the engine valve controlled by the failed variable valve mechanism, and also corrects a fuel injection quantity of a corresponding cylinder group according to the corrected valve opening and closing characteristic of the engine valve controlled by the normal variable valve mechanism.

9. A control apparatus of an internal combustion engine according to claim 1,
   wherein said intake air amount control system using the variable valve mechanism are provided for each cylinder group on each bank of a V-type internal combustion engine.

10. A control apparatus of an internal combustion engine comprising:
- a plurality of intake air amount control means including at least one intake air amount control means using a variable valve mechanism which controls an intake air amount by variably controlling an opening and closing characteristic of an engine valve;
- diagnosis means for diagnosing a failure for each of said plurality of the intake air amount control means; and
- at least one of:
  - first intake air amount adjustment means for adjusting, when said diagnosis means detects that at least one intake air amount control means using the variable valve mechanism has failed, the intake air amount by the other intake air amount control means using the variable valve mechanism which is diagnosed to be normal by said diagnosis means or by the intake air amount control means which does not use the variable valve mechanism, and
  - second intake air amount adjustment means for adjusting, when said diagnosis means detects that said intake air amount control means which does not use the variable valve mechanisms has failed, the intake air amount by at least one intake air amount control means using the variable valve mechanism which is diagnosed to be normal by said diagnosis means.

11. A control method of an internal combustion engine, comprising:
- controlling a plurality of intake air amount control systems including at least one intake air amount control system using a variable valve mechanism which controls the intake air amount by variably controlling an opening and closing characteristic of an engine valve;
- diagnosing a failure for each of said plurality of intake air amount control systems;
- performing at least one of:
  - a first adjusting step for adjusting, when at least one intake air amount control system using the variable valve mechanism is detected to have failed, the intake air amount by the other intake air amount control system using the variable valve mechanism which is diagnosed to be normal or by the intake air amount control system which does not use the variable valve mechanism, and
  - a second adjusting step for adjusting, when said intake air amount control system which does not use the variable valve mechanisms detected to have failed, the intake air amount by at least one intake air amount control system using the variable valve mechanism which is diagnosed to be normal.

12. A control method of an internal combustion engine according to claim 11,
wherein, when said intake air amount control system which is diagnosed to be abnormal has failed such that the intake air amount is reduced, said first adjusting step or said second adjusting step increasingly adjusts the intake air amount by at least one of said intake air amount control systems which are diagnosed to be normal.

13. A control method of an internal combustion engine according to claim 11,
wherein, when said intake air amount control systems which is diagnosed to be abnormal has failed such that the intake air amount is increased excessively, said first adjusting step or said second adjusting step decreasingly adjusts the intake air amount by at least one of said intake air amount control systems which are diagnosed to be normal by said diagnosis mechanism.

14. A control method of an internal combustion engine according to claim 11,
wherein said intake air amount control systems using the variable valve mechanisms control the intake air amount for each of a plurality of cylinder groups independently.

15. A control method of an internal combustion engine according to claim 14,
wherein said plurality of intake air amount control systems includes a plurality of intake air amount control systems using the variable valve mechanism.

16. A control method of an internal combustion engine according to claim 11,
wherein each of said plurality of the variable valve mechanisms comprises:
- a driving shaft which rotates in synchronization with a crankshaft;
- a driving cam fixed to said driving shaft;
- a swing cam which swings to operate the engine valve to open and close;
- a transmission mechanism one end of which is connected with said driving cam side and the other end of which is connected with said swing cam side;
- a control shaft including a control cam to vary a position of said transmission mechanism; and
- an actuator which rotates said control shaft, and
wherein a lift characteristic of the engine valve is made variable by controlling the rotation of said control shaft by said actuator.

17. A control method of an internal combustion engine according to claim 11,
wherein the valve opening and closing characteristic of the engine valve controlled by the variable valve mechanism diagnosed as the failure is detected, and a correction amount of the valve opening and closing characteristic of the engine valve controlled by the normal variable valve mechanism other than the failed variable valve mechanism is determined based on the detection value.

18. A control method of an internal combustion engine according to claim 11,
wherein a fuel injection quantity of a corresponding cylinder group is corrected according to the valve opening and closing characteristic of the engine valve controlled by the failed variable valve mechanism, and also a fuel injection quantity of a corresponding cylinder group is corrected according to the corrected valve opening and closing characteristic of the engine valve controlled by the normal variable valve mechanism.

19. A control method of an internal combustion engine according to claim 11,
wherein said intake air amount control system using the variable valve mechanism controls the intake air amount for each cylinder group on each bank of a V-type internal combustion engine.

20. A control method of an internal combustion engine according to claim 19,
wherein a fuel injection quantity of a corresponding cylinder group is corrected according to the valve opening and closing characteristic of the engine valve controlled by the failed variable valve mechanism, and also a fuel injection quantity of a corresponding cylinder group is corrected according to the corrected valve opening and closing characteristic of the engine valve controlled by the normal variable valve mechanism.

21. A control method of an internal combustion engine according to claim 16,
wherein said plurality of intake air amount control systems controls the intake air amount for each cylinder group on each bank of the V-type internal combustion engine.

22. A control apparatus of an internal combustion engine, comprising:
a plurality of intake air amount control systems;
a diagnosis mechanism which diagnoses a failure for each of said plurality of the intake air amount control systems; and
an intake air amount adjustment mechanism which adjusts an intake air amount, when any of said intake air amount control systems failed, by the intake air amount control system other than the failed intake air amount control system,
wherein, when said diagnosis mechanism detects that any of the intake air amount control systems failed such that the intake air amount is increased excessively, said intake air amount adjustment mechanism decreasingly adjusts the intake air amount of the intake air amount control system other than the intake air amount control system diagnosed as failed.

* * * * *